United States Patent Office 3,186,145
Patented June 1, 1965

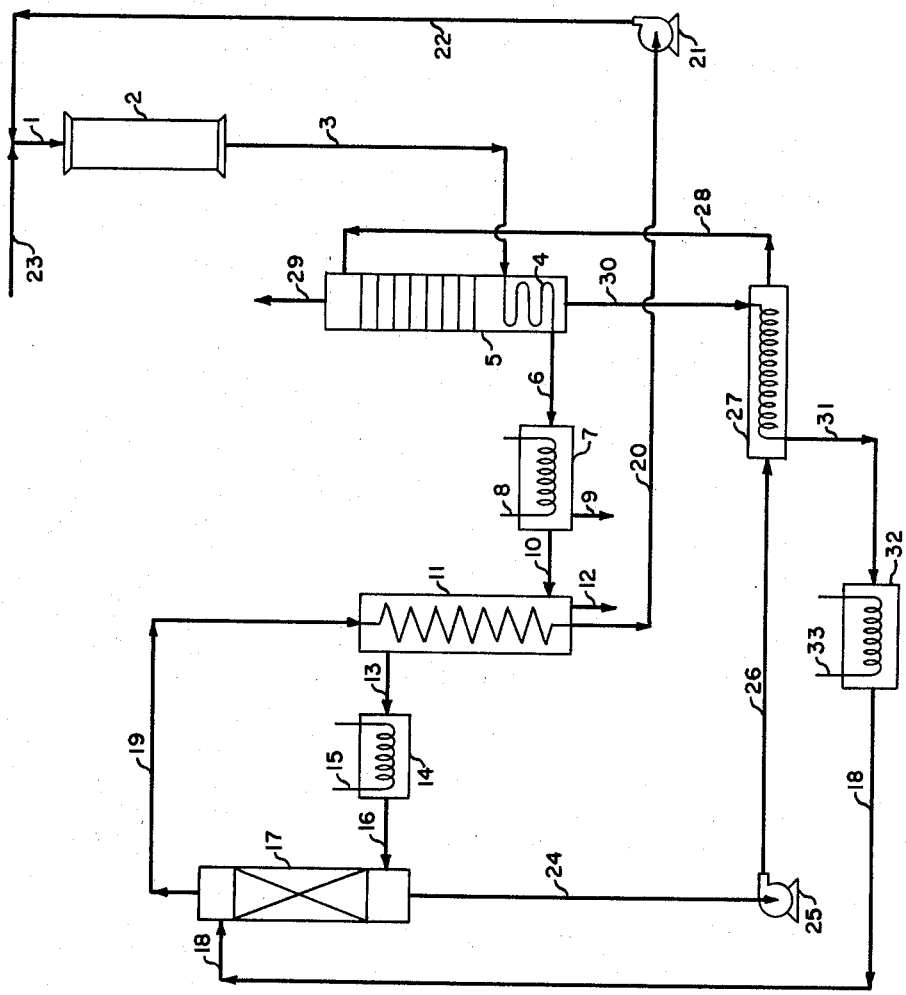

3,186,145
ABSORPTION OF IMPURITIES FROM HYDROGEN-CARBON MONOXIDE SYNTHESIS GAS
Douglas H. Pelton, Wyckoff, N.J., and Basil Powell, Westbury, N.Y., assignors to Chemical Construction Corporation, New York, N.Y., a corporation of Delaware
Filed Jan. 28, 1963, Ser. No. 254,313
3 Claims. (Cl. 55—48)

This invention relates to the removal of certain inert gaseous impurities from synthesis gas, and especially to the removal of such impurties from the synthesis gas in a methanol synthesis process. A selective gas scrubbing process has been developed, which employs liquid methanol at elevated pressure and reduced temperature to absorb and remove inert gaseous impurities such as methane and nitrogen from synthesis gas streams.

Synthesis gas is generally produced as a mixed hydrogen-carbon monoxide gas stream, which also contains significant proportions of insert gaseous components such as methane and nitrogen. For the purpose of the present invention, crude hydrogen itself containing such impurities will also be considered to be a synthesis gas. In any case, when the synthesis gas is employed in a recirculating type of chemical synthesis, the concentration of inert impurities tends to build up. It has been a general practice in the prior art to purge the synthesis system to prevent the concentration of inerts from becoming too great. However, in many cases, this results in the loss of significant proportions of valuable synthesis gas. In the present invention, the inerts are selectively purged from the system after they have been separated from the synthesis gas by means of selective scrubbing with liquid methanol solvent at elevated pressure.

It has been determined that the solubilities in liquid methanol of methane, nitrogen (and ethane, if present) are highest at low temperatures and decrease with increased temperatures. However, even at low temperatures substantial solubility does not exist at pressures below about 50 atmospheres. On the other hand, the solubilities of hydrogen and carbon monoxide are lowest at low temperature and increase somewhat with increased temperatures. The following data table of approximate solubilities shows these relationships with selected point values.

TABLE I

| Component | Solubility in liquid methanol Volumes of gas per volume of methanol per atmosphere partial pressure | |
|---|---|---|
| | 0° C. | 70° C. |
| Methane | 0.564 | 0.046 |
| Nitrogen | 0.216 | 0 |
| Hydrogen | 0.075 | 0.130 |
| Carbon monoxide | 0.125 | 0.324 |

In the present invention, a gas stream containing the above gases is contacted with liquid methanol at a pressure of at least 50 atmospheres and a low temperature such as 0° C. In this way the gases are absorbed in the methanol in proportion to their respective solubilities at 0° C. The liquid methanol containing dissolved gases is then separated from the gas stream and heated to a higher temperature such as 70° C. As a result, most of the previously absorbed nitrogen and methane gas components are removed from the methanol. The methanol is then cooled to 0° C. and again utilized as a gas scrubbing agent. Thus, the process is operated continuously with continuous removal of methane and nitrogen from the gas stream with little or no loss of hydrogen or carbon monoxide.

In a preferred embodiment of the present invention, the process sequence described supra is integrated into a methanol synthesis process, so as to continuously remove methane, nitrogen and ethane from the circulating gas in the synthesis loop. As will appear infra, the autoclave effluent gas stream is first cooled to condense crude product methanol and is then further cooled prior to scrubbing for inerts removal. The purified gas stream is then reheated and recycled to methanol synthesis, together with make-up feed gas. The methanol solvent laden with dissolved inerts is heated by heat exchange to drive off the inerts as purge gas, and is then cooled and recycled to the scrub step.

A principal advantage of the present invention is that the purge of the synthesis loop removes only the inerts, and thus the valuable synthesis gas is saved. In addition, the process may be applied to remove methane and other inerts from the purge stream derived from a standard methanol synthesis loop. After removal of carbon oxides by other known methods, the hydrogen may be utilized for any other purpose, such as the synthesis of ammonia. Since the process operates at high pressure, the compression energy of the purified hydrogen is preserved.

It is an object of the present invention to remove inert gases from synthesis gas.

Another object is to utilize liquid methanol as a selective solvent for the removal of inert gases from synthesis gas.

An additional object is to eliminate the purging of synthesis gas from the synthetic methanol process.

A further object is to remove inert gases including methane, nitrogen and ethane from the methanol synthesis loop.

Still another object is to remove inert gases without loss of pressure.

Still another object is to provide an improved methanol synthesis process.

These and other objects and advantages of the present invention will become evident from the description which follows.

Referring to the figure, a preferred embodiment of the present invention is shown, in conjunction with a methanol synthesis process. A synthesis gas stream 1 containing hydrogen, carbon monoxide and minor amounts of inert impurities such as methane, nitrogen and ethane is passed into methanol synthesis autoclave 2 at an elevated pressure over 50 atmospheres. A catalytic conversion takes place in autoclave 2, and gaseous methanol is formed.

The resulting converted gas stream 3 leaves autoclave 2 at an elevated temperature, and is partially cooled by passing through coil 4 in liquid methanol stripper 5. The converted gas stream leaves coil 4 via 6 and passes to methanol condenser 7, in which the gas stream is further cooled preferably to a temperature below about 35° C. by cooling coil 8. Crude liquid methanol product is thus condensed, and is withdrawn from condenser 7 via 9. The residual synthesis gas stream containing inert gaseous impurities is withdrawn from condenser 7 via 10, and is further cooled in gas-to-gas heat exchanger 11 to a final temperature preferably in the range of −60° C. to 20° C. Further small amounts of liquid methanol are condensed from the gas stream in exchanger 11. This liquid methanol is withdrawn from exchanger 11 via 12, and is combined with the main crude methanol stream 9. The cooled residual gas stream is withdrawn from exchanger 11 via 13 and is now passed through auxiliary refrigerated cooler 14 for further cooling. Cooler 14 is provided with refrigeration coils 15. In some cases unit 14 may be omitted, but in any case the final cooled gas stream 16 is preferably at a temperature in the range of −60° C. to 20° C.

Gas stream 16 now passes into inert gas scrubber 17, which is provided with gas-liquid contact means such as a packed section or bubble cap trays. Purified liquid methanol stream 18 is passed into the upper part of scrubber 17 at a temperature in the range of −60° C. to 20° C., and passes downwards through unit 17. The scrubbing liquid thus absorbs inert gas components from the rising residual gas stream, and a purified residual gas stream is withdrawn from unit 17 via 19 at a temperature in the range of −60° C. to 20° C. The purified gas stream 19 now passes through gas-to-gas heat exchanger 11, and is warmed to a final temperature generally above 20° C. The warmed gas stream 20 now passes through the gas circulation compressor 21, exiting via 22. The gas stream 22 is now recycled to methanol synthesis via 1, together with makeup feed gas stream 23.

Returning to gas scrubber 17, the liquid methanol containing dissolved inerts is withdrawn via 24, and passed through circulation pump 25, exiting via 26. The cold liquid stream 26 is next passed through heat exchanger 27 and is partially warmed. The warmed liquid stream now passes via 28 to methanol stripper 5, in which the liquid is further heated to a temperature preferably in the range of 50° C. to 90° C. by heat exchange with the hot gas in coil 4. The inert gas components and methanol vapors are thus evolved in the lower part of unit 5, and rise through the upper tray section of unit 5. The methanol vapors are for the most part condensed by contact with downflowing liquid stream 28, and the gaseous inerts are discharged as a purge gas via 29. Any uncondensed crude methanol can be condensed and recovered by further cooling of the purge gas.

The purified liquid methanol is removed from unit 5 via 30, partially cooled in heat exchanger 27, and next passed via 31 to heat exchanger 32 provided with refrigeration coils 33. The liquid stream is thus cooled to a temperature in the range of −60° C. to 20° C., and is recycled via 18 for further gas scrubbing.

Numerous alternatives and modifications within the scope of the present invention will occur to those skilled in the art. Thus for example, additional heat exchange between process streams may be practiced in addition to the major stages of heat exchange discussed supra, in order to conserve heat and make the process more efficient.

An example of industrial application of the process of the present invention will now be described.

*Example*

A plant was designed to synthesize methanol from hydrogen-carbon monoxide synthesis gas at 350 atmospheres pressure. The feed gas had the following composition:

| Component: | Mol, percent |
|---|---|
| Hydrogen | 60 |
| Carbon monoxide | 30 |
| Methane | 7 |
| Nitrogen | 3 |
| | 100 |

Thus, the inert gases comprised a total of 10% of the feed gas. In a typical methanol plant of the prior art, the inerts level was held to a maximum of 30% total inerts by purging gas from the system. This meant that a quantity of gas was purged from the system with a total volume equal to ⅓ of the feed gas and containing over 25% of the reactants fed to the system.

The process of the present invention was employed to treat the circulating gas in the methanol synthesis loop. Thus, the same quantity of feed gas was used to produce 25% more methanol with no additional utility requirements other than for refrigeration and pumping of the methanol solvent. The converted gas stream was removed from the methanol converter at 350 atmospheres pressure and 175° C. The gas stream was passed through a coil in the liquid methanol stripper and heated the liquid methanol to 75° C. The gas next passed through the normal crude methanol condenser, in which crude product methanol was condensed at 35° C. The residual gas stream was then cooled to −10° C. in a gas-to-gas heat exchanger, and further cooled to −20° C. by an auxiliary ammonia cooled gas cooler. The cold gas stream was now passed to the inert gas scrubber in which inert gases were absorbed in −20° C. refrigerated methanol. The purified gas was reheated to 25° C. in the gas-to-gas heat exchanger and recycled to the methanol converter.

The liquid methanol containing dissolved inerts was pumped from the inert gas scrubber, and passed through the liquid methanol exchanger. Here the liquid methanol was heated to about 65° C. by exchange with hot purified methanol. The liquid methanol next passed to the liquid methanol stripper, where it was further heated by the hot converter exit gas to 75° C., and inert gases were driven off. The hot purified methanol was cooled to −10° C. in the liquid methanol exchanger, and then cooled to −20° C. in an ammonia cooled methanol cooler. The cold purified liquid methanol was now recycled to the inert gas scrubber.

We claim:

1. Process for removing gaseous impurity selected from the group consisting of methane, ethane and nitrogen, from the effluent gas stream discharged from the synthesis autoclave of the synthesis loop in the catalytic production of synthetic methanol at a pressure above 50 atmospheres, said effluent gas stream principally containing hydrogen and carbon monoxide, which comprises cooling said autoclave effluent gas stream by a first indirect heat exchange with impurity-laden liquid methanol, further cooling said effluent gas stream to condense and remove product crude synthetic methanol, further cooling the residual synthesis gas stream containing gaseous impurity to a final temperature below 20° C. by a second indirect heat exchange with cold purified synthesis gas stream, scrubbing the impurity-containing synthesis gas stream with liquid methanol, and thereby absorbing said impurity into said liquid methanol, separating the resulting methanol stream containing dissolved impurity from the purified synthesis gas stream, heating said purified synthesis gas stream by said second heat exchange, combining the purified synthesis gas stream with fresh feed gas to form a combined gas stream, passing the combined gas stream to methanol synthesis in the synthesis autoclave of the synthesis loop, heating said liquid methanol stream containing dissolved impurity by a third indirect heat exchange with regenerated liquid methanol, further heating and stripping the methanol stream of dissolved impurity in a distillation zone by said first indirect heat exchange, separating stripped gaseous impurity from the liquid methanol stream as a distillate overhead gas, cooling the regenerated liquid methanol by said third heat exchange, and further cooling and recycling the regenerated liquid methanol to said scrubbing step.

2. Process of claim 1, in which said scrubbing step takes place with a methanol temperature in the range of −60° C. to 20° C. and said first heat exchange takes place with a methanol temperature in the range of 50° C. to 90° C.

3. Process for removing gaseous impurity selected from the group consisting of methane, ethane and nitrogen from the effluent gas stream discharged from the synthesis autoclave of the synthesis loop in the catalytic production of synthetic methanol at a pressure above 50 atmospheres, said effluent gas stream principally containing hydrogen and carbon monoxide, which comprises cooling said autoclave effluent gas stream by a first indirect heat exchange with impurity-laden liquid methanol, further cooling said effluent gas stream to a temperature below about 35° C. whereby product crude synthetic methanol is condensed and removed, further cooling the residual synthesis gas stream containing gaseous impurity to a final temperature in the range of −60° C. to 20° C. by a second indirect heat exchange with cold purified synthesis gas stream, scrubbing the impurity-containing synthesis gas stream with liquid methanol at a temperature in the range of −60° C. to 20° C., and thereby absorbing said impurity into said liquid methanol, separating the resulting methanol stream containing dissolved impurity from the purified synthesis gas stream, heating said purified synthesis gas stream by said second heat exchange to a temperature of at least about 20° C., combining the purified synthesis gas stream with fresh feed gas to form a combined gas stream, passing said combined gas stream to methanol synthesis in the synthesis autoclave of the synthesis loop, heating said liquid methanol stream containing dissolved impurity by a third indirect heat exchange with regenerated liquid methanol, further heating the methanol stream to a temperature in the range of 50° C. to 90° C. by said first heat exchange whereby dissolved impurity is gasified and stripped from the liquid methanol stream in a distillation zone and separated as a distillate overhead gas, cooling the regenerated methanol by said third heat exchange, and further cooling and recycling the regenerated liquid methanol to said scrubbing step at a temperature in the range of −60° C. to 20° C.

References Cited by the Examiner
UNITED STATES PATENTS

| | | | |
|---|---|---|---|
| 1,934,029 | 11/33 | Asbury | 55—48 |
| 2,281,228 | 4/42 | Brown | 260—449.5 |
| 2,664,434 | 12/53 | Cromeans | 260—450 |
| 2,826,266 | 3/58 | Hachmuth | 55—48 |
| 2,904,575 | 9/59 | Peet | 260—449.5 |
| 2,964,551 | 12/60 | Woolcock | 260—449.5 |
| 3,001,373 | 9/61 | Eastman et al. | 55—68 X |
| 3,021,682 | 2/62 | Baker et al. | 55—48 |
| 3,064,029 | 11/62 | White | 260—449.5 |

REUBEN FRIEDMAN, *Primary Examiner.*